(12) United States Patent
Thao et al.

(10) Patent No.: US 9,436,661 B2
(45) Date of Patent: Sep. 6, 2016

(54) SYSTEM AND METHOD FOR GENERATING AN INTERACTIVE ENDLESS BELT ROUTING DIAGRAM

(71) Applicants: Johnny Thao, Tulsa, OK (US); Sherry Mathis, Broken Arrow, OK (US); Scott Wilson, Tulsa, OK (US)

(72) Inventors: Johnny Thao, Tulsa, OK (US); Sherry Mathis, Broken Arrow, OK (US); Scott Wilson, Tulsa, OK (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 280 days.

(21) Appl. No.: 14/169,383

(22) Filed: Jan. 31, 2014

(65) Prior Publication Data

US 2015/0221107 A1 Aug. 6, 2015

(51) Int. Cl.
*G06F 3/00* (2006.01)
*G06F 17/22* (2006.01)

(52) U.S. Cl.
CPC ....... *G06F 17/2247* (2013.01); *G06F 17/2235* (2013.01)

(58) Field of Classification Search
CPC ............. G06Q 30/02; G06Q 30/0641; G06Q 30/0256; G06Q 30/0276; G06Q 30/0207; G06Q 30/0273; G06Q 30/0277; G06Q 30/08; G06Q 10/06; G06Q 10/02; G06Q 10/10; G06Q 30/0645; G06Q 30/0633; G06Q 40/08; B65H 2220/01; B65H 2220/03; B65H 2220/02; B65H 2511/11; B65H 2511/51; B65H 2511/52; B65H 2513/10
See application file for complete search history.

(56) References Cited

U.S. PATENT DOCUMENTS

| | | | |
|---|---|---|---|
| 8,538,832 B2 * | 9/2013 | Brownell | G06Q 30/0603 705/26.5 |
| 2003/0191852 A1 * | 10/2003 | Incertis | G06F 17/30876 709/232 |
| 2004/0044743 A1 | 3/2004 | Monell et al. | |
| 2006/0020714 A1 * | 1/2006 | Girouard | G06F 17/30905 709/246 |
| 2006/0259477 A1 * | 11/2006 | Morita | G06F 17/30265 |
| 2010/0064235 A1 * | 3/2010 | Walls | G05B 23/0267 715/763 |
| 2013/0046837 A1 * | 2/2013 | Rahja | H04L 12/58 709/206 |
| 2013/0058560 A1 | 3/2013 | Sobczak et al. | |

(Continued)

OTHER PUBLICATIONS

Web page of Dayco Products, LLC featuring a belt routing diagram, http://www.daycoproducts.com/parts?categoryid=1084&year=2007&make=6&modeltype=4&model=739&description=1726 (published at least as early as Nov. 25, 2013).

(Continued)

*Primary Examiner* — Di Xiao
(74) *Attorney, Agent, or Firm* — Thompson Hine LLP

(57) ABSTRACT

A system and method for generating an interactive routing diagram for an endless belt is disclosed. The routing diagram illustrates a plurality of components associated with an accessory drive system. The system includes a display, a routing database, and a processor. The routing database stores a routing table associated with the routing diagram. The routing table stores routing information indicating a location of at least one hyperlinked character displayed on the routing diagram. The hyperlinked character is associated with a specific component of the accessory drive system. The processor is in communication with the display and the routing database. The processor executes an instruction for generating an image of the routing diagram on the display. The processor also executes an instruction for generating an image of the hyperlinked character upon the routing diagram, where the hyperlinked character is linked to data associated with the specific component.

14 Claims, 10 Drawing Sheets

(56) References Cited

U.S. PATENT DOCUMENTS

2013/0332488 A1 12/2013 Christy et al.
2015/0207884 A1* 7/2015 Wuellner ............... H04L 69/14
709/228

OTHER PUBLICATIONS

Web page of The Gates Corporation featuring a belt routing diagram, http://navigates.gates.com/Parts.aspx?Year=2007&Make=Ford&Model=F+Series+Pickup&Engine=V-6+4.2+L&Class=Passenger+Cars+%26+Light+Trucks&Type=Light+Trucks(published at least as early as Nov. 25, 2013).

Web page of Nissan North America featuring a belt routing diagram, http://parts.nissanusa.com/nissanparts/index.cfm?bodyColor=&trimColor=&Body=HB&ENGINE=HR16DE&GRADE=S%2FLOW&TRANS=MT&action=replacement&groupid=A&sectionid=117&partcode=&jointvehid=18974&makeid=25&siteid=14&illust_seq=01&partnumber=Part+Number&description=Keyword (published at least as early as Nov. 25, 2013).

Web page of The Gates Corporation featuring a car engine diagram, http://www.automotivecare.com/your-engine-101/(published at least as early as Nov. 25, 2013).

Web page of Vevo Systems Co., Ltd., featuring a parts diagram, http://www.soigeris.com/custom/taigmillparts.htm (published at least as early as May 29, 2011).

Web page of Veyance Technologies, Inc. featuring a belt routing diagram, http://partfinder.veyance.com/# (published at least as early as May 12, 2013).

Web page of Parts Town featuring parts diagram, http://www.partstown.com/accutemp/accat1e-2703-1 (published at least as early as Jul. 21, 2013).

Web page of AOL, Inc. featuring the game Mystery of Mortlake, http://www.games.com/play/playrix-entertainment/mystery-of-mortlake-mansion (published at least as early as Oct. 4, 2013).

PCT, International Search Report and Written Opinion; International Application No. PCT/US15/13176 (Jun. 18, 2015).

* cited by examiner

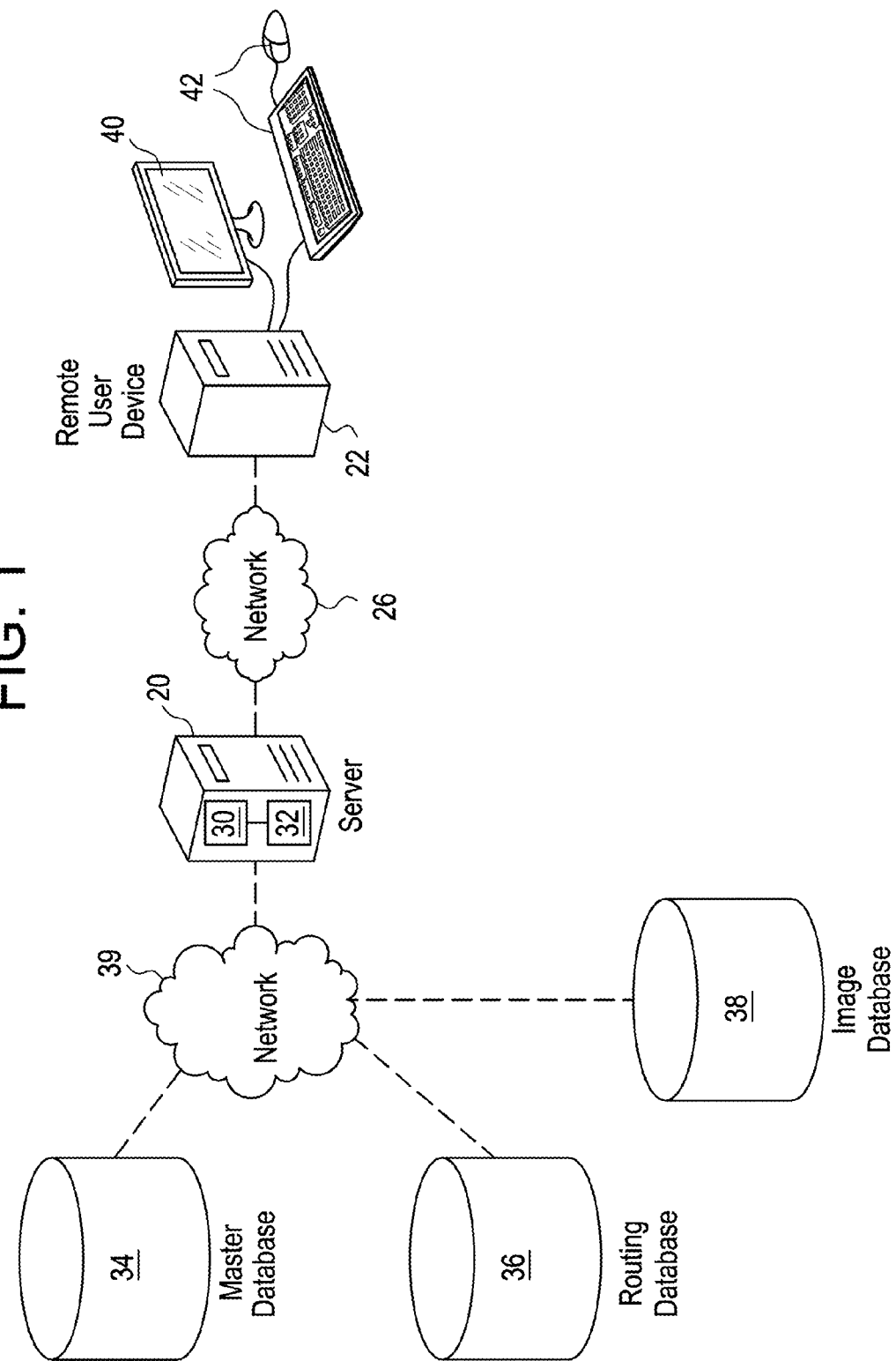

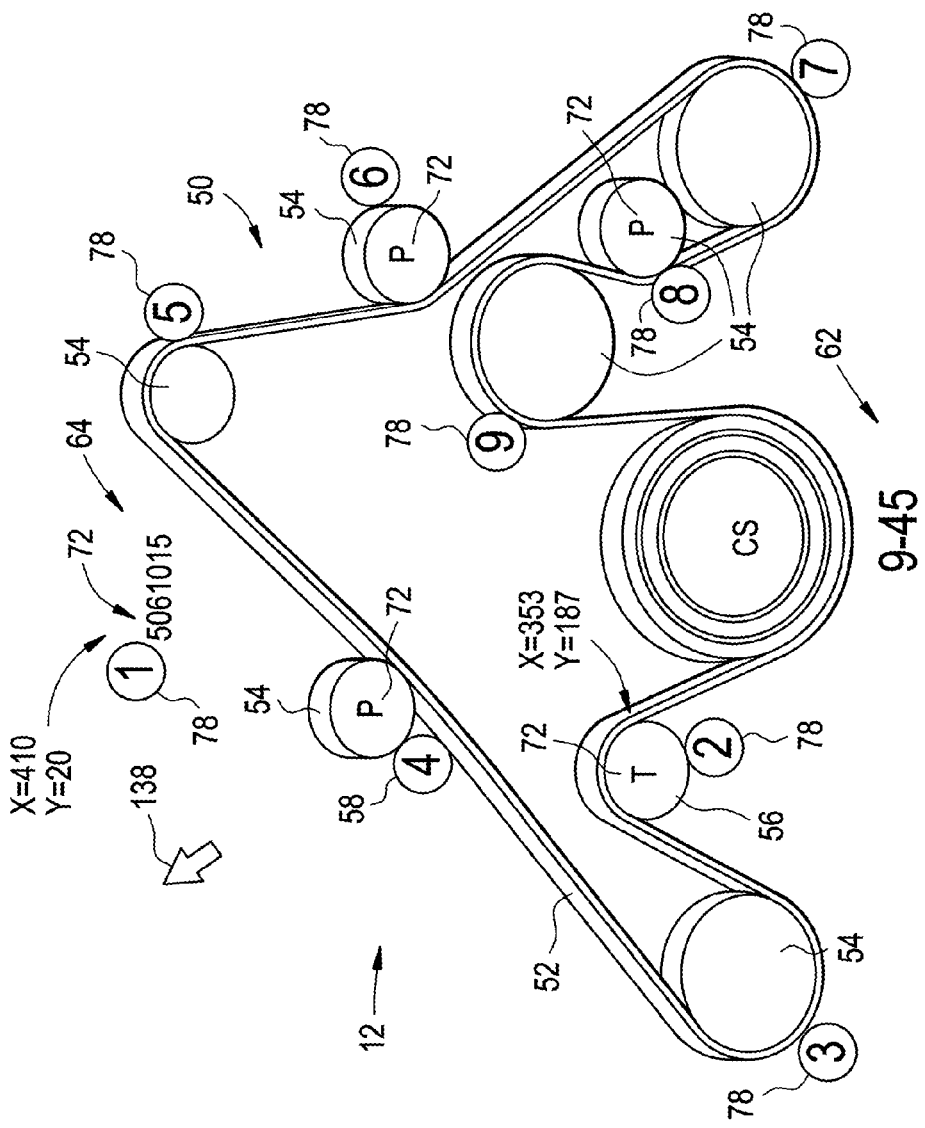

FIG. 3A

| | Column 1<br>Year | Column 2<br>Make | Column 3<br>Model | Column 4<br>Engine | Column 5<br>Part Number | Column 6<br>Remark |
|---|---|---|---|---|---|---|
| Line 1 | 2004 | Ford | F-150 | V8 5.4L GAS Natually Aspirated 5 | 5061015 | Main Drive, w/A.C. |
| Line 2 | 2004 | Ford | F-150 | V8 5.4L GAS Natually Aspirated 5 | 5061015 | Main Drive, w/A.C. |
| Line 3 | 2004 | Ford | F-150 | V8 5.4L GAS Natually Aspirated 5 | 5061015 | Main Drive, w/A.C. |
| Line 4 | 2004 | Ford | F-150 | V8 5.4L GAS Natually Aspirated 5 | 5061015 | Main Drive, w/A.C. |
| Line 5 | 2004 | Ford | F-150 | V8 5.4L GAS Natually Aspirated 5 | 5061015 | Main Drive, w/A.C. |
| Line 6 | 2004 | Ford | F-150 | V8 5.4L GAS Natually Aspirated 5 | 5060833 | Main Drive, w/o A.C. |
| Line 7 | 2004 | Ford | F-150 | V8 5.4L GAS Natually Aspirated 5 | 5060833 | Main Drive, w/o A.C. |
| Line 8 | 2004 | Ford | F-150 | V8 5.4L GAS Natually Aspirated 5 | 5060833 | Main Drive, w/o A.C. |
| Line 9 | 2004 | Ford | F-150 | V8 5.4L GAS Natually Aspirated 5 | 5060833 | Main Drive, w/o A.C. |
| Line 10 | 2005 | Ford | F-150 | V8 5.4L GAS Natually Aspirated 5 | 5061015 | Main Drive, w/A.C. |
| Line 11 | 2005 | Ford | F-150 | V8 5.4L GAS Natually Aspirated 5 | 5061025 | Main Drive, w/A.C. |
| Line 12 | 2005 | Ford | F-150 | V8 5.4L GAS Natually Aspirated 5 | 5061025 | Main Drive, w/A.C. |
| Line 13 | 2005 | Ford | F-150 | V8 5.4L GAS Natually Aspirated 5 | 5061025 | Main Drive, w/A.C. |
| Line 14 | 2005 | Ford | F-150 | V8 5.4L GAS Natually Aspirated 5 | 5061025 | Main Drive, w/A.C. |
| Line 15 | 2005 | Ford | F-150 | V8 5.4L GAS Natually Aspirated 5 | 5061025 | Main Drive, w/A.C. |
| Line 16 | 2010 | Ford | F-150 | V8 5.4L FLEX Natually Aspirated V | 5061024 | Main Drive |
| Line 17 | 2010 | Ford | F-150 | V8 5.4L FLEX Natually Aspirated V | 5061024 | Main Drive |
| Line 18 | 2010 | Ford | F-150 | V8 5.4L FLEX Natually Aspirated V | 5061024 | Main Drive |
| Line 19 | 2010 | Ford | F-150 | V8 5.4L FLEX Natually Aspirated V | 5061024 | Main Drive |
| Line 20 | 2010 | Ford | F-150 | V8 5.4L FLEX Natually Aspirated V | 5061024 | Main Drive |
| Line 21 | 2006 | Ford | F-150 | V8 5.4L GAS Natually Aspirated 5 | 5061025 | Main Drive, w/A.C. |
| Line 22 | 2006 | Ford | F-150 | V8 5.4L GAS Natually Aspirated 5 | 5061025 | Main Drive, w/A.C. |
| Line 23 | 2006 | Ford | F-150 | V8 5.4L GAS Natually Aspirated 5 | 5061025 | Main Drive, w/A.C. |
| Line 24 | 2006 | Ford | F-150 | V8 5.4L GAS Natually Aspirated 5 | 5061025 | Main Drive, w/A.C. |

FIG. 3B

| | Column 7<br>Routing Number | Column 8<br>Button Number | Column 9<br>X | Column 10<br>Y | Column 11<br>Type | Column 12<br>Dayco PN |
|---|---|---|---|---|---|---|
| Line 1  | 9-45 | 1 | 410 | 20  | S | 5061015 |
| Line 2  | 9-45 | 2 | 353 | 187 | T | 89263   |
| Line 3  | 9-45 | 4 | 373 | 100 | P | 89006   |
| Line 4  | 9-45 | 6 | 526 | 108 | P | 89006   |
| Line 5  | 9-45 | 8 | 535 | 188 | P | 89130   |
| Line 6  | 9-45 | 1 | 410 | 20  | S | 5060833 |
| Line 7  | 9-45 | 2 | 353 | 187 | T | 89385   |
| Line 8  | 9-45 | 4 | 373 | 100 | P | 89006   |
| Line 9  | 9-45 | 6 | 526 | 108 | P | 89006   |
| Line 10 | 9-45 | 8 | 535 | 188 | P | 89130   |
| Line 11 | 9-45 | 1 | 410 | 20  | S | 5061025 |
| Line 12 | 9-45 | 2 | 353 | 187 | T | 89263   |
| Line 13 | 9-45 | 4 | 373 | 100 | P | 89006   |
| Line 14 | 9-45 | 6 | 526 | 108 | P | 89006   |
| Line 15 | 9-45 | 8 | 535 | 188 | P | 89130   |
| Line 16 | 9-45 | 1 | 410 | 20  | S | 5061024 |
| Line 17 | 9-45 | 2 | 353 | 187 | T | 89263   |
| Line 18 | 9-45 | 4 | 373 | 100 | P | 89006   |
| Line 19 | 9-45 | 6 | 526 | 108 | P | 89006   |
| Line 20 | 9-45 | 8 | 535 | 188 | P | 89130   |
| Line 21 | 9-45 | 1 | 410 | 20  | S | 5061025 |
| Line 22 | 9-45 | 2 | 353 | 187 | T | 89263   |
| Line 23 | 9-45 | 4 | 373 | 100 | P | 89006   |
| Line 24 | 9-45 | 6 | 526 | 108 | P | 89006   |

70

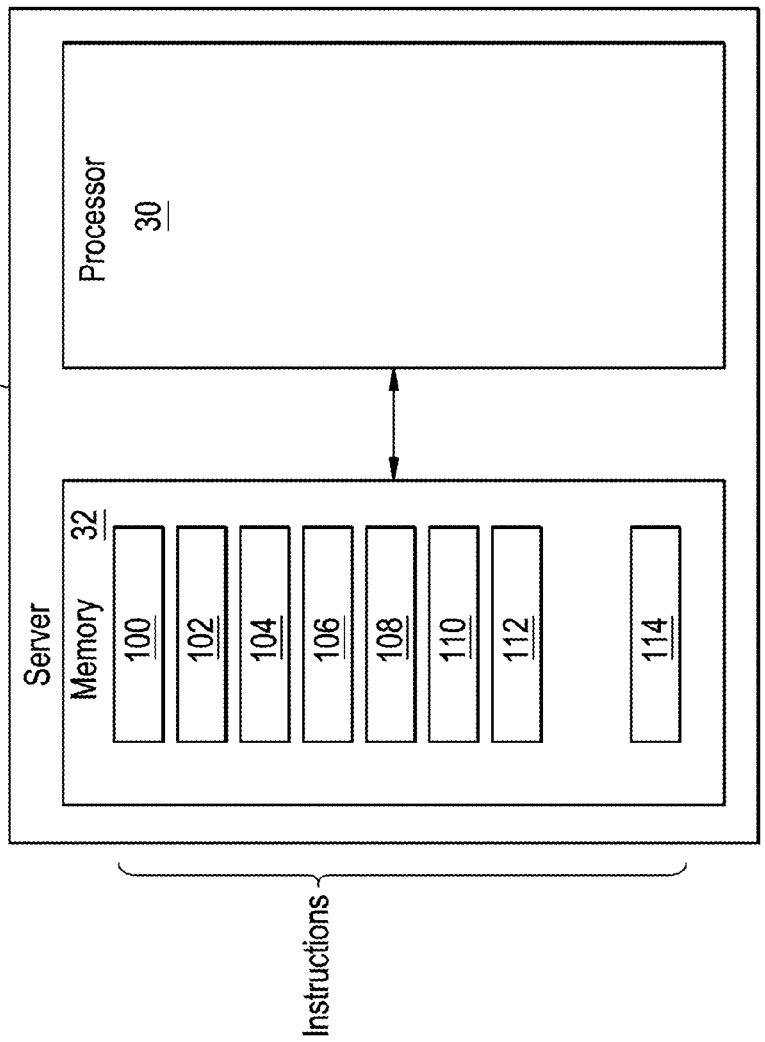

FIG. 5

| Automotive & Light Truck | | | | |
|---|---|---|---|---|
| Year 2004 | Make Ford | Type Truck | Model F-150 | Engine V8 5.4L GAS Naturally Aspirated 5 |

| Application | Description | Part Number | Footnote | Images | Additional Info |
|---|---|---|---|---|---|
| Serpentine Belt | Main Drive, w/ A.C. | 5061015 | | | Spes Routing Brochure Video |
| Serpentine Belt | Main Drive, w/o A.C. | 5060833 | | | Spes Routing Brochure Video |
| Automatic Belt Tensioner | w/ A.C. | 89263 | | | Instructions Video — 126 |
| Automatic Belt Tensioner | w/o A.C. | 89385 | | | Instructions |
| Idler Pulley | Grooved Pulley | 89130 | | | Specs |
| Idler Pulley | Smooth Pulley | 89006 | | | Specs |
| Tensioner Pulley | w/ A.C. | 89007 | | | Specs |
| Tensioner Pulley | w/o A.C. | 89051 | | | Specs |

124

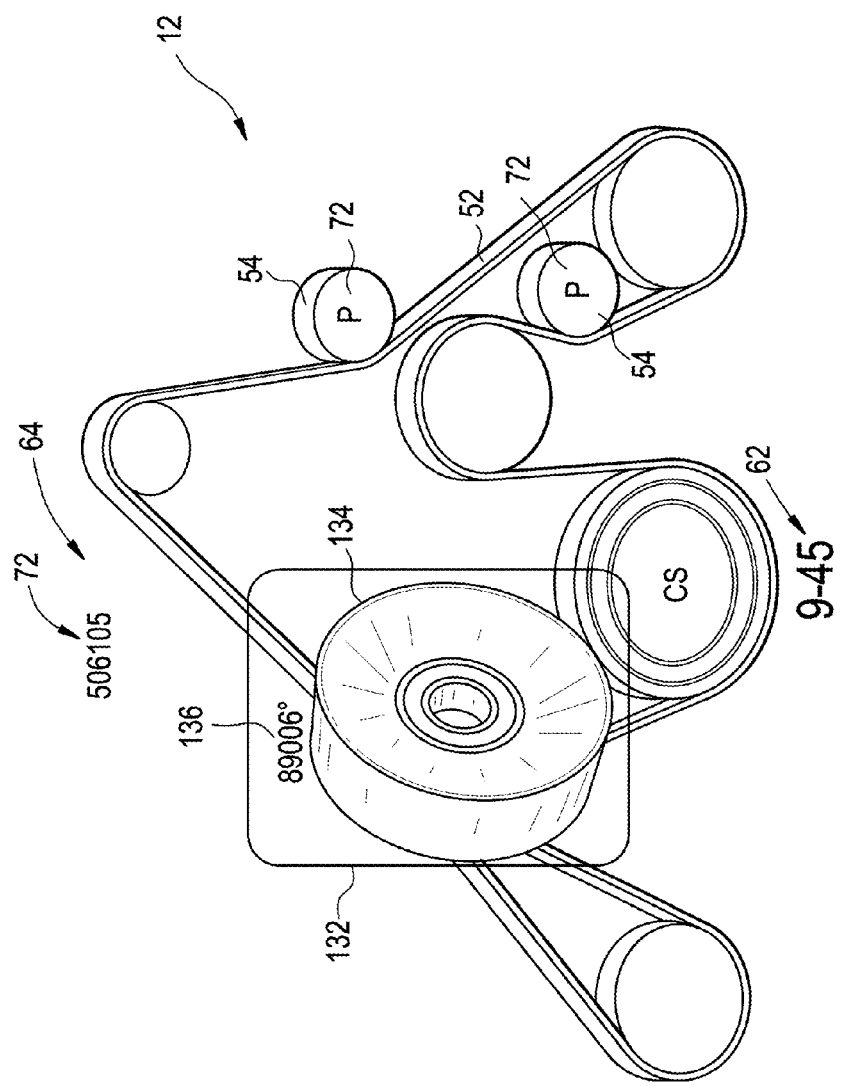

FIG. 8
Specs/Images — 140
| Part Specifications | |
|---|---|
| Attributes | Specifications |
| BearingID 1 (min) | 17 |
| Flange | N |
| Flat | Y |
| Max Belt Width | 06 Rib |
| No of Bearings | 1 |
| Pulley Diameter (mm) | 90 |
| Pulley Material | Steel |
| Pulley Type | Serpentine |
| Pulley Width (mm) | 30 |
144
| Images | |
|---|---|
| View | Image |
| Front | 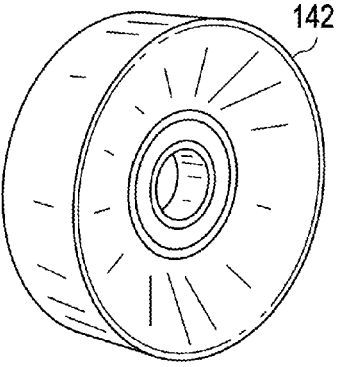 142 |
| Back | 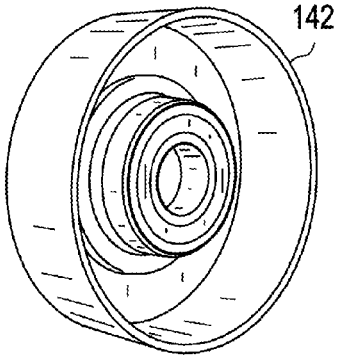 142 |

SYSTEM AND METHOD FOR GENERATING AN INTERACTIVE ENDLESS BELT ROUTING DIAGRAM

TECHNICAL FIELD

The present invention relates generally to a system and method for generating an image of an interactive routing diagram for an endless belt, where at least one hyperlinked character is superimposed upon the routing diagram.

BACKGROUND

Various automobile accessory assemblies including, for example, a water pump, an alternator/generator, a fan for cooling coolant, a power steering pump, and a compressor, may be driven using the vehicle engine. In particular, a driving pulley actuated by an engine shaft of the motor vehicle drives an endless drive belt that in turn drives the accessory assemblies through driven pulleys. The endless drive belt, the various pulleys, and a tensioner pulley assembly may be referred as an accessory drive system.

A routing diagram displays the specific location of various components associated with the accessory drive system, and also illustrates how the endless drive belt is routed in relation to the various pulleys. Some automobile manufacturers as well as automotive component manufacturers may have websites available online or applications that are downloadable to a mobile device that allow a user to view the routing diagram associated with a specific vehicle. For example, a user may select a specific vehicle year, make, model, and engine type, as well as the part number associated with the endless drive belt of his or her vehicle. The user may then be able to view the routing diagram unique to his or her vehicle on the website or mobile device application.

Several drawbacks exist with the routing diagrams currently available that make it challenging for a user to perform maintainance or repair on the accessory drive system of a vehicle. Specifically, a user may not be able to view the part numbers associated with the various components illustrated in the routing diagram. Moreover, the routing diagram does not provide any detailed information associated with the components illustrated in the routing diagram.

SUMMARY

In one aspect, a system and method for generating an interactive routing diagram for an endless belt is disclosed. The disclosed routing diagram illustrates various components associated with an accessory drive system. A processor is used to generate the interactive routing diagram, and the routing diagram may be viewed by a user on a display. The routing diagram may include at least one hyperlinked character that is associated with a specific component of the accessory drive system. A user may direct a curser to hover over the hyperlinked character by manipulating a user interface. The processor generates detailed information regarding the specific component of the accessory drive system that appears on the display based on the curser hovering over the hyperlinked character of the routing diagram.

In one embodiment, the detailed information regarding the specific component of the accessory drive system may be shown on a floating window that may be viewed on the display. The floating window includes a picture of the component and a part number associated with the component. If a user selects the picture shown on the floating window, the processor may generate a second window that is viewed on the display. The second window may include multiple images as well as detailed specifications of the specific component of the accessory drive system.

In one embodiment, a system for generating an interactive routing diagram for an endless belt is disclosed. The routing diagram illustrates a plurality of components associated with an accessory drive system. The system includes a display, a routing database, and a processor. The routing database stores a routing table associated with the routing diagram. The routing table stores routing information indicating a location of at least one hyperlinked character displayed on the routing diagram. The hyperlinked character is associated with a specific component of the accessory drive system. The processor is in communication with the display and the routing database. The processor executes an instruction for generating an image of the routing diagram on the display. The processor also executes an instruction for generating an image of the hyperlinked character upon the routing diagram, where the hyperlinked character is linked to data associated with the specific component of the accessory drive system.

In another embodiment, a method for interacting with a routing diagram for an endless belt is disclosed. The routing diagram illustrates a plurality of components associated with an accessory drive system. The method includes generating an image of the routing diagram by a processor. The image of the routing diagram is shown on a display. The routing diagram includes at least one hyperlinked character associated with a specific component of the accessory drive system. The method includes hovering a cursor over the hyperlinked character, where the cursor is controlled by a user interface. The method also includes generating a floating window by the processor based on the curser hovering over the hyperlinked character. The floating window includes data associated with the specific component of the accessory drive system.

BRIEF DESCRIPTION OF THE DRAWING

FIG. 1 is a schematic illustration of a system for generating an interactive routing diagram for an endless belt, where the system includes a server and a remote user device;

FIG. 2 is an exemplary illustration of the routing diagram generated by the system shown in FIG. 1;

FIGS. 3A-3B are an exemplary illustration of a routing table that corresponds with the routing diagram shown in FIG. 2;

FIG. 4 is an illustration of the server shown in FIG. 1;

FIG. 5 is an illustration of an interactive image generated by the server shown in FIG. 1;

FIG. 6 is an illustration of another interactive image generated by the server shown in FIG. 1;

FIG. 7 is an illustration of a floating window interactive image generated by the server shown in FIG. 1;

FIG. 8 is an illustration of another window generated by the server shown in FIG. 1;

DETAILED DESCRIPTION

Figure 9:
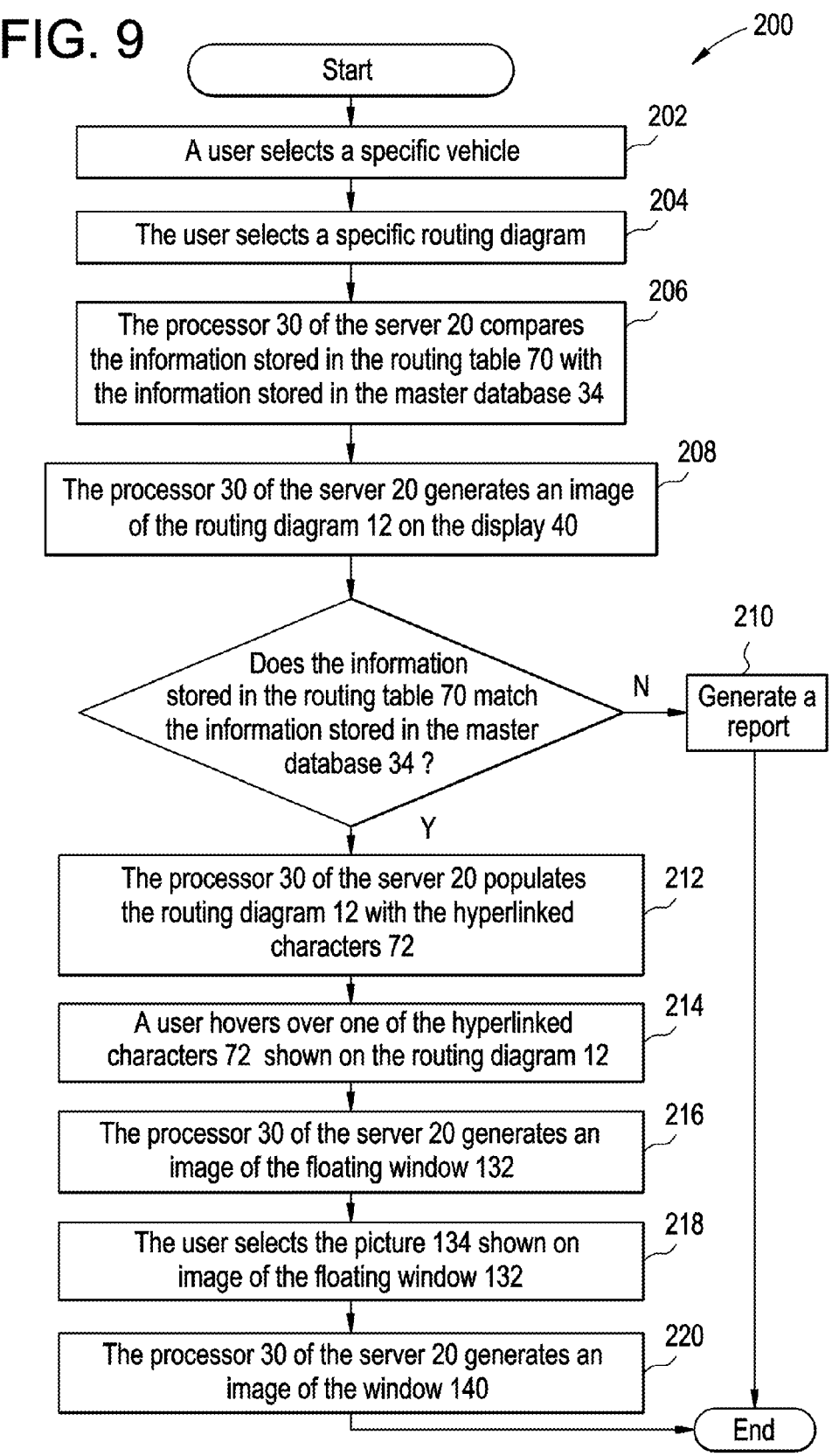
FIG. 9 is an exemplary process flow diagram illustrating a method of generating the routing diagram shown in FIG. 2.

The following detailed description will illustrate the general principles of the invention, examples of which are additionally illustrated in the accompanying drawings. In the drawings, like reference numbers indicate identical or functionally similar elements.

Referring now to FIG. 1, an exemplary schematic diagram of a system 10 for generating an interactive endless belt routing diagram 12 (shown in FIG. 2) is illustrated. The system 10 may include a server 20 in communication with a remote user device 22 through a network 26. The server 20 may include a processor 30 and memory 32. When the server 20 is in operation, the processor 30 executes instructions stored within the memory 32, to communicate data to and from the memory 32, and to generally control operations of the processing server 20 pursuant to the instructions. The processor 30 of the server 20 may be any custom made or commercially available processor, a central processing unit (CPU), an auxiliary processor among several processors associated with the server 20, a semiconductor based microprocessor (in the form of a microchip or chip set), a macroprocessor, or generally any device for executing instructions. The network 26 may be any type of electronic communication medium such as, for example, the Internet.

The server 20 may also be in communication with a master database 34, a routing database 36, and an image database 38 through a network 39. The network 39 may be any type of electronic communication medium such as, for example, a local area network (LAN). FIG. 1 illustrates the master database 34, the routing database 36, and the image database 38 each stored in servers (not illustrated) that are separate from the server 20. However, it is to be understood that the master database 34, the routing table database 36, or the image data base 38 may also be stored within the memory 32 of the server 20. Moreover, in one embodiment, the information stored within the routing database 36 may be combined with the master database 34.

The remote user device 22 may be any type of network-enabled device for executing a web-based browser such as, for example, a desktop computer, a laptop computer, or a mobile device. The mobile device may be any type of electronic device a user may hold in his or her hand such as, for example, a digital media player, a personal e-mail device, a personal data assistant (PDA), a cellular telephone, a handheld gaming device, or a digital camera. The remote user device 22 may include a display 40 and a user interface 42. The display 40 may be any type of device capable of generating viewable images such as, for example, a liquid crystal display (LCD), a plasma display, a light emitting diode (LED), or a projector. The user interface 42 may be any type of device configured to receive input from a user such as, for example, a touchscreen, a scanning device, or a voice-activated device. In the non-limiting embodiment as shown in FIG. 1, the user interface 42 is a keyboard and mouse.

Turning to FIG. 2, the routing diagram 12 illustrates an exemplary accessory drive system 50 associated with an engine of a specific vehicle (not illustrated). The accessory drive system 50 includes a serpentine or endless belt 52, a plurality of pulley assemblies 54, and a tensioner 56. The tensioner 56 may include a pulley assembly. Alternatively, in another embodiment, the tensioner 56 may include a hydraulic actuator. A crankshaft pulley is annotated with 'CS'. The routing diagram 12 may be used to illustrate how the endless belt 52 is routed in relation to the pulley assemblies 54, the tensioner 56, and the crankshaft pulley CS.

A routing number 62 is associated with the routing diagram 12. The routing number 62 may be unique to the routing diagram 12. For example, in the embodiment as shown in FIG. 2, the routing number 62 associated with the routing diagram 12 is '9-45'. The routing diagram 12 may also display a belt part number 64 associated with the endless belt 52. For example, in the embodiment as shown in FIG. 2, the belt part number 64 is '5061015'.

FIGS. 3A-3B illustrates an exemplary routing table 70. The routing table 70 may be stored in the routing table database 36 (shown in FIG. 1). The routing table 70 may contain information pertaining to at least one routing diagram. For example, referring to FIGS. 2-3B, the routing table 70 lists the parts associated with the routing diagram 12 shown in FIG. 2. Specifically, the parts associated with the routing diagram 12 are listed in lines 1-5 of the routing diagram 70.

It should be noted that the routing table 70 only contains information relating to five of the components illustrated in the routing diagram 12 (FIG. 2). This is because information may not be available for all of the components illustrated in the routing diagram 12. Specifically, a vehicle component manufacturer may only supply a portion of the parts illustrated in the routing diagram 12. Thus, the vehicle component manufacturer may only include information pertaining to the parts they manufacture in the routing table 70. However, it is to be understood if a manufacturer supplies all of components illustrated in the routing diagram 12, then all of the components illustrated in the routing diagram 12 would be listed in the routing table 70. In the embodiment as shown in FIGS. 2-3B, the components illustrated in the routing diagram 12 that are listed in the routing table 70 are annotated with a hyperlinked character 72. For example, the tensioner 56 may be annotated with a 'T' and the pulley assemblies 54 may be annotated with a 'P'. The annotated 'P' and 'T' may be hyperlinked to images and data associated with the corresponding pulley assembly 54 or the tensioner 56, and is described in greater detail below. The belt part number 64 may also be a set of hyperlinked characters 72. The belt part number 64 may be hyperlinked to images and data associated with the endless belt 52, and is also described in greater detail below.

A unique button number 78 is also associated with the endless belt 52, the pulley assemblies 54, and the tensioner 56. For example, button number 1 is associated with the endless belt 52, and button number 2 is associated with the tensioner 56. Button numbers 3-9 are associated with various pulley assemblies 54. However, it is to be understood that the button numbers 1-9 shown in FIG. 2 are for purposes of explanation only, and are not visible on the routing diagram 12. The button numbers 78 are used to indicate the specific location of the hyperlinked characters 72 displayed on the routing diagram 12, and are described in greater detail below.

In the non-limiting embodiment as shown in FIGS. 3A-3B, the routing table lists information pertaining to various routing diagrams associated with a Ford F-150 vehicle. However, it is to be understood that this illustration is merely exemplary in nature. Those skilled in the art will appreciate that the routing table 70 as shown in FIGS. 3A-3B may include information pertaining to routing diagrams for any number of different types of vehicles. For example, the routing table 70 may include information pertaining to routing diagrams associated with another make of vehicle (e.g., vehicles manufactured by General Motors). Moreover, those skilled in the art will appreciate that the information listed in the routing table 70 is not limited to passenger cars and trucks. For example, in one embodiment the routing table 70 may contain information pertaining to a routing diagram for an all-terrain vehicle, a snowmobile, a heavy-duty truck, or lawn and garden tractors.

Referring to FIGS. 2-3B, column 1 of the routing table 70 may list a specific year of a vehicle. Column 2 of the routing table 70 may list a specific make of vehicle (e.g., Ford®). Column 3 of the routing table 70 may list a specific model of vehicle (e.g., F-1500). Column 4 of the routing table 70 lists the engine associated with a specific vehicle. For example, lines 1-5 of the routing table 70 list the engine associated with the routing diagram 12 in FIG. 2 as a 'V8 5.4 L GAS Naturally Aspirated 5' type engine. Column 5 of the routing table 70 may list the belt part number associated with the endless belt for the specific vehicle. For example, lines 1-5 of the routing table 70 list the belt part number as '5061015', which is the belt part number 64 associated with the endless belt 52 shown in FIG. 2. Column 6 of the routing table 70 may list any comments or fitment notes associated with the endless belt listed in column 5. For example, lines 1-5 of the routing table 70 state that the routing diagram 12 as shown in FIG. 2 is for the 'Main Drive, w/o A.C.', which means that the endless belt 52 in FIG. 2 is for a vehicle without an air conditioner. Column 7 of the routing table 70 may list the routing number associated with a specific routing diagram. For example, lines 1-5 of the routing table 70 list the routing number 62 associated with the routing diagram 12 shown in FIG. 2 as '9-45'.

Column 8 of the routing table 70 lists the button number 78 (shown in FIG. 2). The button number 78 indicates the location of the hyperlinked characters 72 displayed on the routing diagram 12 (shown in FIG. 2). It should be noted that while the routing diagram 12 illustrates the components associated with buttons 3, 5, and 7, these components are not listed in the routing table 70, as they are not supplied by the manufacturer. Column 9 of the routing table 70 lists the x-coordinate of the button number 78 listed in column 8. Column 10 of the routing table 70 lists the y-coordinate associated with the button number 78 listed in column 8. For example, line 1 of the routing table 70 lists button 1 having an x-coordinate of 410 and a y-coordinate of 20. Referring to FIG. 2, the location of the hyperlinked characters 72 related to the belt part number 64 are located at an x-coordinate location of 410 and a y-coordinate location of 20 on the routing diagram 12. Similarly, line 2 of the routing table 70 lists button 2 having an x-coordinate location of 353 and a y-coordinate location of 187. Referring to FIG. 2, the location of the hyperlinked character 'T' related to the tensioner 56 is located at an x-coordinate location of 353 and a y-coordinate location of 187 on the routing diagram 12.

Referring to FIGS. 3A-3B, column 11 of the routing table 70 lists the type of component associated with the button number 78 listed in column 9. For example, line 1 of the routing table 70 lists the endless belt 52 shown in FIG. 2. An 'S' listed in column 11 represents the endless belt 52. Line 2 of the of the routing table 70 lists the tensioner 56 shown in FIG. 2. A 'T' listed in column 12 represents the tensioner 56. Line 3 of the routing table 70 lists one of the pulley assemblies 54 shown in FIG. 2. A 'P' listed in column 12 represents the pulley 54. Column 12 of the routing table 70 lists the part number of the component associated with the button number listed in column 9. For example, line 1 of the routing table lists part number '5061015', which is the part number of the endless belt 52.

Referring to FIGS. 1-2 and 4, the memory 30 of the server 20 may include a plurality of instructions 100, 102, 104, 106, 108, 110, 112, and 114 stored therein that are executable by the processor 30 for interacting with the remote user device 22, the master database 34, the routing database 36, and the image database 38. The instructions 100, 102, 104, 106, 108, 110, 112, and 114 enable the routing diagram 12 (FIG. 2) to be generated upon the display 40, and also enable an individual to interact with the routing diagram 12 by the user interface 42. Specifically, as described in greater detail below, a user may be able to hover or mouse over the hyperlinked character 72 associated with one of the components shown in the routing diagram 12. Hovering over a specific one of the hyperlinked character 72 may cause a pop-up or floating window 132 (shown in FIG. 7) to appear on the display 40. The floating window 132 may include an image of the component and the part number associated with the hyperlinked character 72.

Figure 10:
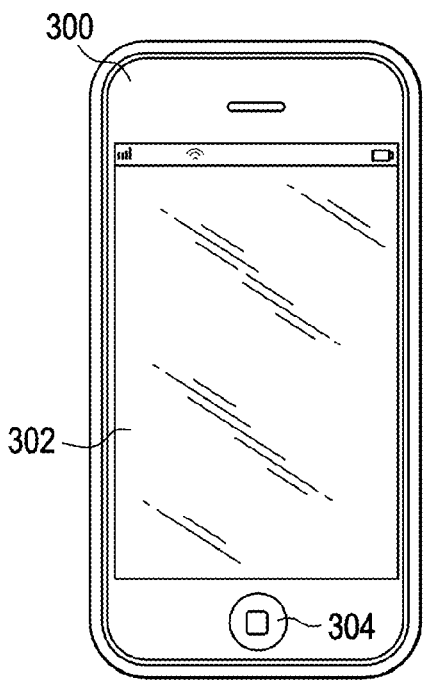
FIG. 10 is an illustration of an alternative embodiment of the disclosure, where a portable electronic device is used for generating the routing diagram shown in FIG. 2.
Figure 11:
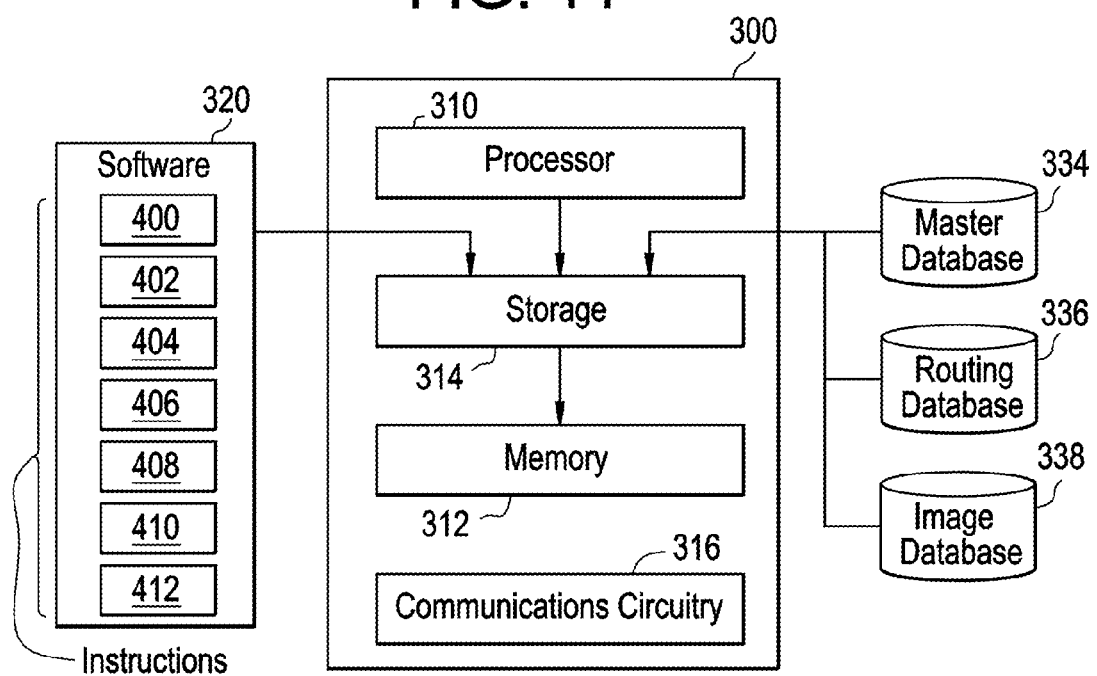
FIG. 11 is a schematic illustration of the portable electronic device shown in FIG. 10.

In the embodiment as shown in FIGS. 1 and 4, the system 10 may be a web-based application. Specifically, the remote user device 22 may execute a web-based browser for retrieving information from the server 20. Some examples of web-based browsers executable by the remote user device 22 include, but are not limited to, Internet Explorer® and Mozilla Firefox®. The server 20 may deliver web content through the network 26. For example, a webpage generated by the server 20 may be sent over the network 26 to the remote user device 22. In the alternative embodiment as shown in FIGS. 10-11, software may be downloaded to an electronic device 300. The software may be used to generate the routing diagram 12, and is described in greater detail below.

Referring to FIGS. 1-2, 4, and 5, the processor 30 of the server 20 may execute instruction 100, which generates an interactive image 120 shown on the display 40 of the remote user device 22. The interactive image 120 may be part of a webpage hosted by a vehicle component manufacturer. The webpage may allow users to view various routing diagrams available for various vehicles.

The interactive image 120 may be used to select a specific vehicle. For example, in the embodiment as shown in FIG. 5, the interactive image 120 may include a series of expandable drop-down lists 122. The lists 122 only display a single value in FIG. 5 (e.g., the leftmost list 122 only displays 'Year 2004'). However those skilled in the art will appreciate the lists 122 may expand to show multiple options if selected (e.g., the leftmost list 122 may expand to display every model year from 1927 to the present year). The lists 122 allow a user to select a specific vehicle based on year, make, type of vehicle, model, and engine. A user may select the specific vehicle by manipulating the user interface 42 (i.e., a user may click the mouse seen in FIG. 1 in order to select the year, make, type of vehicle, model, and engine.) However, it is to be understood that other approaches exist for selecting a specific vehicle. In one embodiment, a user may select the specific vehicle by entering a vehicle identification number ("VIN") associated with his or her vehicle. In another embodiment, a scanning tool (not illustrated) may be used to scan a VIN that is associated with a user's vehicle. In yet another embodiment, a user may select the specific vehicle by entering the state and license plate number where his or her vehicle is currently registered.

Referring to FIGS. 2, 4, and 6, the processor 30 of the server 20 may execute instruction 102. Instruction 102 generates an interactive image 130 shown on the display 40 (it should be noted that only a portion of the interactive image 130 is shown in FIG. 6). The interactive image 130 lists the components that are available for the specific vehicle selected by the user using the interactive image 120 shown in FIG. 5 (e.g., the 2004 Ford-150). The interactive image also includes links 124, 126 to various routing diagrams associated with the specific vehicle. For example, in the embodiment as shown in FIG. 6 the first line of the interactive image 122 lists the endless belt 52 shown in FIG. 2. The right-most column of the interactive image 122 provides the link 124 that is labelled as 'Routing'. The link 124 is hyperlinked text that displays the routing diagram 12 (shown in FIG. 2) if selected. Thus, if a user wants to view the routing diagram 12 associated with the endless belt 52, the user selects the link 124.

Referring to FIGS. 1-2, 4, and 7, the processor 30 of the server 20 may execute instruction 104 based on the user selecting the specific routing diagram associated with the vehicle (e.g., the user selects the link 124 shown in FIG. 6). Instruction 104 compares the information stored in the routing table 70 associated with the routing diagram 12 (which was chosen by selecting link 124 in FIG. 6) with information stored in the master database 34, and determines if the two sets of information match one another. Specifically, the master database 34 contains the same information stored in the routing table 70. However, the master database 34 may be updated periodically to reflect any changes, corrections, or updates made to components. Thus, comparing the information stored in the routing table 70 with the information stored in the master database 34 may confirm the information stored in the routing table 70 is valid. In addition to the information stored in the routing table 70, the master database 34 may also store specifications 144 (shown in FIG. 8) regarding the various components illustrated in the routing diagram 12.

Referring to FIGS. 1-2, and 4, the processor 30 of the server 20 may execute instruction 106. Instruction 106 generates an image of the routing diagram 12 (which was chosen by selecting link 124 in FIG. 6) on the display 40. The image database 38 stores the routing diagram 12. Instruction 106 fetches the routing diagram 12 from the image database 38. Instruction 106 also generates an image of the routing diagram 12 retrieved from the image database 38. The image of the routing diagram 12 is shown on the display 40. It should be noted that instruction 106 is executed by the processor 30 of the server 30 regardless of whether the information stored in the routing table 70 matches the information stored in the master database 34 (this comparison was performed by instruction 104). However, if the information stored in the routing table 70 does not match the information stored in the master database 34, instructions 108, 110, and 112 may not be executed by the processor 30. Instead, the processor 30 of the server 20 may execute instruction 114, which generates an error report (not illustrated). The report may indicate the specific information stored in the routing table 70 that does not match the information stored in the master database 34.

Continuing to FIGS. 1-2, 4, if the information stored in the routing table 70 matches the information stored in the master database 34, then the processor 30 of the server 20 may execute instruction 108. Instruction 108 populates the routing diagram 12 with the hyperlinked characters 72. Specifically, the hyperlinked characters 72 may be superimposed upon the routing diagram 12 shown on the display 40. The hyperlinked text 72 may include the belt part number 62, the 'T' associated with the tensioner 56, and the 'P' associated with the pulley assemblies 54. The specific location of the hyperlinked text 72 on the routing diagram 12 may be determined by the button numbers shown in column 9 of the routing table 70.

Once the routing table 12 is populated with the hyperlinked text, a user may be able to hover over one of the hyperlinked characters 72 by manipulating the user interface 42. For example, the user may direct a curser 138 (shown in FIG. 2) that is controlled by the mouse (shown in FIG. 1) to hover over one of the hyperlinked characters 72 that are superimposed on the routing diagram 12. The processor 30 of the server 20 generates the floating window 132 (shown in FIG. 7) associated with a component linked to the hyperlinked character 72 based on the curser 138 hovering over the hyperlinked character 72. Specifically, referring to FIGS. 1-2, 4, and 7 the processor 30 of the server 20 may execute instruction 110 based on the curser 138 hovering over one of the hyperlinked characters 72 on the routing diagram 12. Instruction 110 fetches a picture 134 associated with the component linked to the hyperlinked character 72 from the image database 38. The picture 134 is associated with the component linked to the hyperlinked character 72. Specifically, as seen in FIG. 7, the picture 134 includes an image as well as a part number 136 of the component. Once the picture 134 is retrieved from the image database 38, instruction 110 may then generate an image of the floating window 132 on the display 40.

In one exemplary embodiment, a user may hover over the pulley assembly 54 in the upper left hand corner (the pulley assembly 54 is visible in FIG. 2). The processor 30 of the server 20 may then execute instruction 110. Instruction 110 fetches the picture 134 associated with the pulley assembly 54 in the upper left hand corner of the routing diagram 12 from the image database 38. Instruction 110 may then generate an image of the floating window 132 (shown in FIG. 7).

Referring specifically to FIGS. 2 and 7, the floating window 132 may provide a user with the ability to confirm the part number 136 associated with a specific component listed in the routing diagram 12. For example, a user may easily see that the part number 136 associated with the pulley assembly 54 located in the upper right hand corner of the routing diagram 12 is '89006'. Moreover, the floating window 132 also provides the user with the ability to view an image of the specific component as well. For example, the picture 134 seen in FIG. 7 is an image of the pulley assembly 54 located in the upper right hand corner of the routing diagram 12.

A user may select the picture 134 of the floating window 132 by the user interface 42 (e.g., a user may click the mouse shown in FIG. 1 in order to select the picture 134 shown on the display 40). The picture 134 is linked to a new window 140 (shown in FIG. 8). Thus, selecting the picture 134 of the floating window 134 generates an image of the window 140 on the display 40. The new window 140 may include multiple pictures 142 as well as specifications 144 regarding the specific component shown in the floating window 132. Specifically, referring to FIGS. 1-2, 4, and 7-8, the processor 30 of the server 20 may execute instruction 112 based on the user selecting the picture 134 shown on floating window 132. Instruction 112 fetches the pictures 142 of the specific component from the image database 38. Instruction 112 may also fetch information related to the specifications 144 from the master database 34. Instruction 112 may then generate an image of the window 140 on the display 40 based on the pictures 142 retrieved from the image database 38 and the specifications 144 retrieved from the master database 34.

Referring to FIG. 8, the specifications 144 may include any attributes unique to the specific component. For example, the specific component shown in FIG. 8 is an idler pulley. The specifications may list attributes such as, for example, a bearing inner diameter (in millimeters), if the pulley assembly includes a flange, if the pulley includes a flat, maximum belt width, the number of bearings included with the idler pulley, the pulley diameter, the pulley material, the pulley type, and the width of the pulley. However, it is to be understood that other attributes of the pulley may be listed as well. In an alternative embodiment, if the endless belt (FIG. 2) is displayed in the window 140, some attributes of the endless belt 52 that may be listed in the specification 144 may include, for example, the type of material the endless belt 52 is constructed of, the thickness of the endless belt 52, and the width of the endless belt 52. In another embodiment, if the tensioner 56 (FIG. 2) is displayed in the window 140 some attributes of the tensioner 56 that may be listed in the specification 144 may include, for example, the type of tensioner (e.g., hydraulic, automatic, or manual), the tensioner direction (e.g., clockwise, counterclockwise, or linear), the number of pulleys (if applicable), pulley width (if applicable), and pulley diameter (if applicable).

FIG. 9 is an exemplary process flow diagram illustrating a method 200 of generating the routing diagram 12 shown in FIG. 2. Referring generally to FIGS. 1-9, method 200 may begin at block 202, where a user selects the specific vehicle. For example, in the embodiment as shown in FIG. 5, a user may select the specific vehicle based on year, make, type of vehicle, model, and engine. However, in another embodiment, the user may also select the specific vehicle based on the VIN or the state and license plate number where his or her vehicle is registered. Method 200 may then proceed to block 202.

In block 204, a user may select a specific routing diagram associated with the vehicle selected in block 202. For example, FIG. 6 illustrates the interactive image 130, which includes links 124, 126. The link 124 is hyperlinked text that displays the routing diagram 12 (shown in FIG. 2). Thus, a user may select the routing diagram 12 associated with the endless belt 52 by selecting the link 124. Method 200 may then proceed to block 206.

In block 206, the processor 30 of the server 20 may execute instruction 104 based on the user selecting the specific routing diagram associated with the vehicle. Instruction 104 compares the information stored in the routing table 70 associated with the routing diagram 12 selected in block 204 with information stored in the master database 34. Instruction 104 also determines if the information stored in the routing table 70 matches the information stored in the master database 34. Method 200 may then proceed to block 208.

In block 208, the processor 30 of the server 20 may execute instruction 106, which generates an image of the routing diagram 12 selected in block 204 on the display 40. If the information stored in the routing table 70 does not match the information stored in the master database 34 as executed by instruction 104 in block 206, then method 200 may proceed to block 210. In block 210, the processor 30 of the server 20 may execute instruction 114, which generates a report (not illustrated). The report may indicate the specific information stored in the routing table 70 that does not match the information stored in the master database 34. Method 200 may then terminate.

If the information stored in the routing table 70 matches the information stored in the master database 34 as executed by instruction 104 in block 206, method 200 may then proceed to block 212. In block 212, the processor 30 of the server 20 may execute instruction 108, which populates the routing diagram 12 shown on the display 40 with the hyperlinked characters 72. Specifically, as seen in FIG. 2 the hyperlinked text 72 may include the belt part number 62, the 'T' associated with the tensioner 56, and the 'P' associated with the pulley assemblies 54. Method 200 may then proceed to block 214.

In block 214, a user may control the curser 138 (shown in FIG. 2) by the mouse (shown in FIG. 1) to hover over one of the hyperlinked characters 72. For example, the user may direct the mouse shown in FIG. 1 over the hyperlinked character 72 annotated as 'P' located in the upper left hand corner of the routing diagram 12 (shown in FIG. 2). Method 200 may then proceed to block 216.

In block 216, the processor 30 of the server 20 may execute instruction 110 based on the cursor 138 hovering over one of the hyperlinked characters 72 on the routing diagram 12. Instruction 110 generates the floating window 132. Method 200 may then proceed to block 218.

In block 218, the user may select the picture 134 that is part of the floating window 132 (shown in FIG. 7). For example, a user may click the mouse shown in FIG. 1 in order to select the picture 134 of the floating window 132. Method 200 may then proceed to block 220.

In block 220, the processor 30 of the server 20 may execute instruction 112 based on the user selecting the picture 134 shown on floating window 132. Instruction 112 fetches the pictures 142 of the specific component from the image database 38. Instruction 112 may also fetch information related to the specifications 144 from the master database 34. Instruction 112 may then generate an image of the window 140 on the display 40 based on the pictures 142 retrieved from the image database 38 and the specifications 144 retrieved from the master database 34. Method 200 may then terminate.

FIG. 10 is an alternative embodiment of the electronic device 300 for generating an image of the interactive routing diagram 12 shown in FIG. 2. In the embodiment shown in FIG. 10, the electronic device 300 may be a portable electronic device that is sized to fit in a user's hand such as, for example, a digital media player, a personal e-mail device, a personal data assistant (PDA), a cellular telephone, a handheld gaming device, or a digital camera. The electronic device 300 may include a display 302 and a user interface 304. The display 302 may be a touchscreen, and the user interface 304 may be a button. In one embodiment, the display 302 may be a touchscreen, where a user may select images or text shown on the display 302 with his or her fingers, or an object such as a stylus.

Referring to FIGS. 10-11, the electronic device 300 may include a processor 310, memory 312, storage 314, and communications circuitry 316. In one embodiment, the memory 312 and the storage may be combined together. The communications circuitry 316 may be any type of circuitry operative to connect to a communications network and to transmit communications (e.g., voice or data) from the electronic device 100 to other devices within a communications network. The communications circuitry 316 may be operative to interface with the communications network using any suitable communications protocol such as, for example, Wi-Fi (e.g., a 802.11 protocol), radio frequency systems (e.g., 900 MHz, 1.4 GHz, and 5.6 GHz communication systems), infrared, global system for mobile communications (GSM), code division multiple access (CDMA), quadband, and other cellular protocols, voice over Internet protocol (VoIP), or any other protocol.

Software 320 may be downloaded into the storage 314 of the electronic device 300. In addition to the software 320, a master database 334, a routing database 336, and an image database 338 may also be downloadable into the storage 314 of the electronic device 300. Alternatively, in another embodiment, the master database 334, the routing database 336, and the image database 338 may be stored on a server (not shown) remote from the electronic device 300. The communications circuitry 314 may be operative to interface with the server storing the master database 334, the routing database 336, and the image database 338.

The software 320 may include a plurality of instructions 400, 402, 404, 406, 408, 410, and 412. Similar to the embodiment as described in FIGS. 1-8, the instructions 400, 402, 404, 406, 408, 410, and 412 enable the routing diagram 12 (FIG. 2) to be shown on the display 302, and also enable an individual to interact with the routing diagram 12. Specifically, referring to FIGS. 2, 5, and 10-11, the processor 310 of the electronic device 300 may execute instruction 400, which provides for the interactive image 120 (FIG. 5) to be shown on the display 302 of the electronic device 300. As described above, the interactive image 120 may be part of a webpage used to view a routing diagram of an accessory drive system. The interactive image 120 may be used to select a specific vehicle.

Referring to FIGS. 2, 6, and 10-11, the processor 310 of the electronic device 300 may execute instruction 402. Instruction 402 provides for the interactive image 130 to be shown on the display 302 of the electronic device 300. The interactive image 130 lists the components that are available for the specific vehicle selected using the interactive image 120 shown in FIG. 5 (e.g., the 2004 Ford-150). Similar to the embodiment as described above in FIGS. 1-9, if a user wants to view the routing diagram 12 associated with the endless belt 52, the user may select the link 124.

Referring to FIGS. 2-3B, 7, and 10-11, the processor 310 of the electronic device 300 may execute instruction 404 based on the user selecting the specific routing diagram associated with the vehicle (e.g., the user selects the link 124 shown in FIG. 6). Instruction 404 compares the information stored in the routing table 70 associated with the routing diagram 12 (which was chosen by selecting link 124 in FIG. 6) with information stored in the master database 334, and determines if the two sets of information match one another.

Referring to FIGS. 1-2, and 10-11, the processor 310 of the electronic device 300 may execute instruction 406. Instruction 406 generates an image of the routing diagram 12 (which was chosen by selecting link 124 in FIG. 6) on the display 302 of the electronic device 300. Specifically, the image database 338 stores the routing diagram 12. Instruction 406 fetches the routing diagram 12 from the image database 338. Instruction 406 may then generate an image of the routing diagram 12 on the display 302 of the electronic device 300 based on the routing diagram retrieved from the image database 338. Similar to the embodiment as described above in FIGS. 1-9, instruction 406 is executed by the processor 310 regardless of whether the information stored in the routing table 70 matches the information stored in the master database 334 (this comparison was performed by instruction 404). However, if the information stored in the routing table 70 does not match the information stored in the master database 334, instructions 408, 410, and 412 may not be executed by the processor 310. Instead, an error report (not illustrated) may be generated. The report may indicate the specific information stored in the routing table 70 that does not match the information stored in the master database 334.

Continuing to FIGS. 1-2, 4, and 10-11, the processor 310 of the electronic device 300 may execute instruction 408 if the information stored in the routing table 70 matches the information stored in the master database 334. Instruction 408 populates the routing diagram 12 shown on the display 302 with the hyperlinked characters 72. Once the routing table 12 is populated with the hyperlinked text, the user may direct the curser 138 (shown in FIG. 2) controlled by the by the touchscreen to hover over one of the hyperlinked characters 72 that are superimposed on the routing diagram 12.

Hovering over one of the hyperlinked characters 72 using the curser 138 causes the processor 310 of the electronic device 300 to generate the floating window 132 (shown in FIG. 7). Specifically, referring to FIGS. 1-2, 7, and 10-11, the processor 310 of the electronic device 300 may execute instruction 410 based on the curser 138 hovering over one of the hyperlinked characters 72 on the routing diagram 12. Instruction 410 fetches the picture 134 associated with the component linked to the hyperlinked character 72 from the image database 338. Once the picture 134 is retrieved from the image database 338, instruction 310 may then generate an image of the floating window 132 on the display 302 of the electronic device 300.

Once the floating window 132 is shown on the display 302 of the electronic device 300, a user may select the picture 134 of the floating window 132. For example, if the display 302 is a touchscreen then the user may tap the display 302 using his or her fingers in order to select the picture 134. Once the picture 134 is selected by the user, the processor 310 of the electronic device 300 may generate an image of the new window 140 (shown in FIG. 8) on display 302. Specifically, referring to FIGS. 1-2, 7-8, and 10-11, the processor 310 of the electronic device 300 may execute instruction 412 based on the user selecting the picture 134 of the floating window 132. Instruction 408 fetches the pictures 142 of the specific component from the image database 338. Instruction 112 may also fetch information related to the specifications 144 from the master database 334. Instruction 412 may then generate an image of the window 140 on the display 302 of the electronic device 300 based on the pictures 142 retrieved from the image database 338 and the specifications 144 retrieved from the master database 334.

Referring generally to FIGS. 1-11, the disclosed system allows for a user hover one of the hyperlinked characters 72 shown in the routing diagram 12 using the curser 138 (shown in FIG. 2). Detailed information regarding the component associated with the hyperlinked character 72 may then be generated on a display. The detailed information may include, for example, a picture, the part number, or part specifications of the component illustrated in the routing diagram 12. It should be noted that various routing diagrams currently available do not allow for user interaction. Therefore, users may not be able to view part numbers or detailed information regarding any of the components illustrated in the routing diagram. In contrast, the disclosed system generates an interactive routing diagram that allows for a user to easily view detailed information regarding one or more of the components in an accessory drive system.

The embodiments of this invention shown in the drawings and described above are exemplary of numerous embodiments that may be made within the scope of the appended claims. It is contemplated that numerous other configurations of the tensioner may be created taking advantage of the disclosed approach. In short, it is the applicant's intention that the scope of the patent issuing herefrom will be limited only by the scope of the appended claims.

What is claimed is:

1. A system for generating a routing diagram for an endless belt, wherein the routing diagram illustrates a plurality of components associated with an accessory drive system, the system comprising:
   a display;
   a routing database storing a routing table associated with the routing diagram, wherein the routing table stores routing information indicating a location of at least one hyperlinked character displayed on the routing diagram, and wherein the hyperlinked character is associated with a specific component of the accessory drive system; and
   a processor in communication with the display and the routing database, the processor:
   executing an instruction for generating a first image of the routing diagram on the display; and
   executing an instruction for generating a second image of the hyperlinked character upon the routing diagram, wherein the hyperlinked character is linked to data associated with the specific component of the accessory drive system, wherein the hyperlinked character is linked to a floating window and the floating window includes a picture and a part number of the specific component of the accessory drive system, and wherein the picture of the floating window is linked to a second window including multiple pictures and specifications regarding the specific component of the accessory drive system.

2. The system as recited in claim 1, wherein the specific component of the accessory drive system is one of an endless belt, a pulley assembly, and a tensioner.

3. The system as recited in claim 1, wherein the system is a web-based application, and wherein the processor is in communication with the display through a network.

4. The system as recited in claim 1, wherein the system is an electronic device that includes storage, and wherein the storage includes downloadable software.

5. The system as recited in claim 1, wherein the electronic device is a portable electronic device.

6. The system as recited in claim 1, further comprising a master database in communication with the processor, wherein the master database stores a second set of information that indicates the location of the hyperlinked character displayed on the routing diagram.

7. The system as recited in claim 6, wherein the processor executes an instruction for comparing the routing information stored in the routing database with the second set of information stored in the master database.

8. The system as recited in claim 7, wherein the processor executes the instruction for generating the second image of the hyperlinked character upon the routing diagram only if the routing information stored in the routing database matches the second set of information stored in the master database.

9. A method for interacting with a routing diagram for an endless belt, wherein the routing diagram illustrates a plurality of components associated with an accessory drive system, the method comprising:
   generating an image of the routing diagram by a processor, wherein the image of the routing diagram is shown on a display, and wherein the routing diagram includes at least one hyperlinked character associated with a specific component of the accessory drive system;
   hovering a cursor over the hyperlinked character, wherein the cursor is controlled by a user interface;
   generating a floating window by the processor based on the curser hovering over the hyperlinked character, wherein the floating window includes data associated with the specific component of the accessory drive system, wherein the floating window includes a picture and a part number of the specific component of the accessory drive system;
   selecting the picture of the floating window by the user interface, wherein the picture is linked to a second window; and
   generating a second image of a second window on the display by the processor, wherein the second window includes multiple pictures and specifications regarding the specific component of the accessory drive system.

10. The method as recited in claim 9, further comprising selecting a specific vehicle by the user interface.

11. The method as recited in claim 10, further comprising selecting a link to the routing diagram by the user interface, wherein the routing diagram is associated with the specific vehicle.

12. The method as recited in claim 9, wherein the specific component of the accessory drive system is one of an endless belt, a pulley assembly, and a tensioner.

13. The method as recited in claim 9, wherein the processor is part of a web-based application and is in communication with the display through a network.

14. The method as recited in claim 9, wherein the processor is part of an electronic device that includes storage, wherein the storage includes downloadable software.

* * * * *